(12) United States Patent
Bertin et al.

(10) Patent No.: US 6,880,036 B2
(45) Date of Patent: Apr. 12, 2005

(54) APPARATUS FOR RECEIVING AUDIOVISUAL PROGRAMS

(75) Inventors: Jean-Pierre Bertin, Guemene-Penfao (FR); Xavier Guitton, Montgermont (FR); Phippe Lepoil, Chantepie (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 441 days.

(21) Appl. No.: 09/943,746

(22) Filed: Aug. 31, 2001

(65) Prior Publication Data

US 2002/0083259 A1 Jun. 27, 2002

(30) Foreign Application Priority Data

Sep. 5, 2000 (FR) .............................. 00 11262

(51) Int. Cl.$^7$ .............................................. G06F 13/00
(52) U.S. Cl. ........................ 710/313; 710/38; 710/110
(58) Field of Search ......................... 710/38, 62, 107, 710/110, 305, 306, 313, 316

(56) References Cited

U.S. PATENT DOCUMENTS

| | | | | |
|---|---|---|---|---|
| 5,541,670 | A | | 7/1996 | Hanai .......................... 348/705 |
| 5,784,581 | A | | 7/1998 | Hannah ....................... 395/290 |
| 5,991,842 | A | | 11/1999 | Takayama .................... 710/105 |
| 6,516,205 | B1 | * | 2/2003 | Oguma ........................ 455/557 |
| 6,549,968 | B1 | * | 4/2003 | Hart ............................ 710/303 |
| 6,584,519 | B1 | * | 6/2003 | Russell ........................ 710/62 |
| 6,636,923 | B1 | * | 10/2003 | Meirsman et al. ........... 710/305 |
| 2001/0001563 | A1 | * | 5/2001 | Tomaszewski .............. 348/552 |
| 2001/0047441 | A1 | * | 11/2001 | Robertson ..................... 710/65 |
| 2002/0023267 | A1 | * | 2/2002 | Hoang .......................... 725/87 |
| 2002/0112175 | A1 | * | 8/2002 | Makofka et al. ............. 713/200 |

FOREIGN PATENT DOCUMENTS

WO   WO 00/26876   5/2000

OTHER PUBLICATIONS

Universal Serial Bus Specification Revision 2.0, pp. v–xiv and 150, Apr. 27, 2000.*
"Universal Serial Bus Specification" Revision 1.1 of Sep. 23, 1998, pp. 1–311, XP–002167362.
"USB and FireWire Connecting all Digital Devices via a Single Cable," Elektor Electronics, GB, Elektor Publishers Ltd. Canterbury, vol. 24, nr. 263, pp. 10–13, XP000869486.
French Search Report citing the above-listed references: AA, AB, AC, AM, AR, AS, and AT.

* cited by examiner

Primary Examiner—Glenn A. Auve
(74) Attorney, Agent, or Firm—Joseph S. Tripoli; Robert D. Shedd; Catherine A. Ferguson

(57) ABSTRACT

The present invention relates to an apparatus for receiving audio-visual programs comprising a circuit for communication with means of connection to a bi-directional communication network, wherein the apparatus comprises:

a first connector comprising at least one conductor for the transmission of a supply voltage (VBUS) originating from the master apparatus, at least one second connector allowing the connection of at least one peripheral device, a splitter connected on the one hand to the first connector and the at least one second connectors and on the other hand to a controller, means of detection of the presence of the supply voltage in the first connector, the means of detection being linked to the first connector and generating a switching control signal in response to the presence of the supply voltage (VBUS) to switch the apparatus from a first mode of operation to a second mode of operation.

9 Claims, 2 Drawing Sheets

US 6,880,036 B2

APPARATUS FOR RECEIVING AUDIOVISUAL PROGRAMS

FIELD OF THE INVENTION

The present invention relates to an apparatus for receiving audio-visual programs which can for example be linked to a personal computer and/or to at least one peripheral such as a printer. The apparatus for receiving audio-visual programs can, for example, consist of a decoder or any other apparatus linkable to a bi-directional communication network.

BACKGROUND

Most digital decoders for cable television network will be equipped with a return pathway. This return pathway will be used in particular for functions of interactivity between the user of the decoded audio video program and the operator of the television network. However, such decoders are not designed to be connected to master systems such as for example a personal computer or to peripherals such as a printer in order to utilize on the one hand all the resources of the decoder and on the other hand the return pathway.

The object of the present invention is therefore to equip an apparatus for receiving audio-visual programs, such as for example a digital decoder, with devices necessary to allow connection and communication with at least one other apparatus and to allow the use by this other apparatus, of at least one peripheral of the audio-visual apparatus, without modifying the way in which the other apparatus is plugged into the decoder.

SUMMARY OF THE INVENTION

This objective is achieved by the apparatus for receiving audio-visual programs comprising a circuit for communication with means of connection to a bi-directional communication network, wherein the apparatus comprises a first connector of a communication bus with a master apparatus, the first connector comprising at least one conductor for the transmission of a supply voltage originating from the master apparatus, at least one second connector of the communication bus, each second connector allowing the connection of at least one peripheral device, a splitter connected on the one hand to the first connector and the at least one second connector and on the other hand to a controller, means of detection of the presence of the supply voltage in the first connector, the means of detection being linked to the first connector and generating a switching control signal to the switching circuit, in response to the presence of the supply voltage so as to switch the apparatus from a first mode of operation to a second mode of operation, where the switching circuit establishes communications between the master apparatus connected to the first connector and said at least one peripheral device connected to said at least one second connector.

According to another feature, the first mode of operation is a so-called master mode of operation, in which the apparatus behaves as a master in relation to each peripheral device, the second mode of operation is a so-called peripheral mode of operation in which the apparatus behaves as a peripheral in relation to the master apparatus.

According to another feature, the first connector is a B type USB connector and each second connector is an A type USB connector.

According to another feature, the switching circuit comprises a quad switch, linked to the controller and to the second connector, so as to allow the link between the second connector and the controller.

According to another feature, the switching circuit comprises a quad switch, linked to the controller and to a two-pathway splitter, the two-pathway splitter linked to the first connector so as to allow in a second switching state a second link between on the one hand the first connector and the controller and on the other hand the first link from the first connector to the second connector.

According to another feature, a link transmits the supply voltage detection signal so as to control the switching from one state to the other, to an input of the controller and to an input of the main microprocessor.

According to another feature, when the quad switch is switched into a first state, the apparatus operates in peripheral mode and when the quad switch is switched into a second state, the apparatus operates in master mode.

According to another feature, the master apparatus is a personal computer and the apparatus comprises a digital decoder connected to the communication network so as to allow the computer to communicate with the network.

According to another feature, the at least one peripheral device is linked to the second connector of the apparatus by way of an additional splitter external to the decoder.

BRIEF DESCRIPTION OF THE DRAWINGS

The invention, together with its characteristics and advantages, will emerge more clearly on reading the description given with reference to the appended drawings in which.

DETAILED DESCRIPTION

Figure 1A:
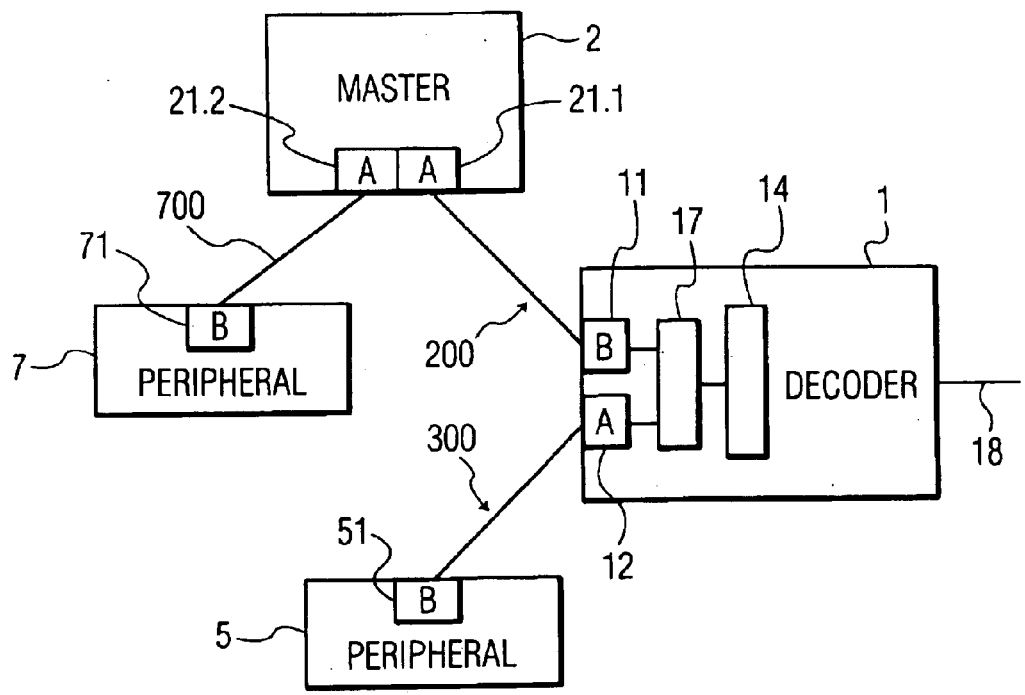
FIGS. 1A and 1B represent a diagrammatic view of the possible connections between an apparatus according to the invention and a master apparatus and respectively at least one peripheral.
Figure 1B:
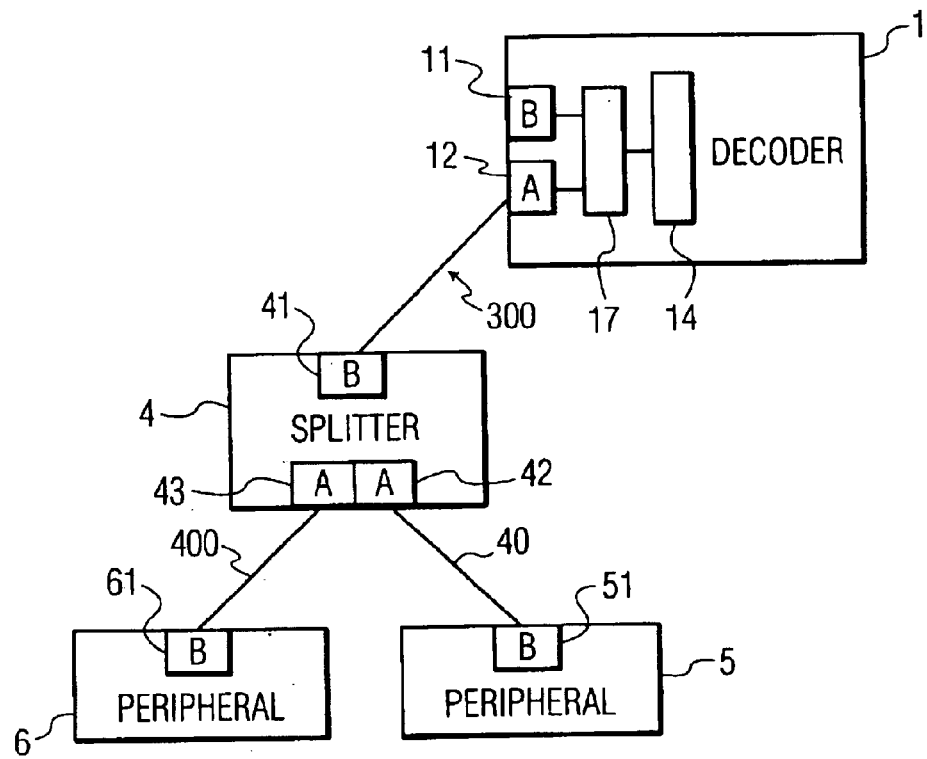

A non-limiting embodiment of the invention will now be described with reference to FIGS. 1A, 1B and 2.

According to the present exemplary embodiment, the apparatus (1) for receiving audio-visual programs, for example consisting of a digital decoder of DVB type, comprises a first connector (11), for example, a B type USB (Universal Serial Bus) connector. The B type USB connector allows, according to FIG. 1A, the connection of a master apparatus (2), which will be the master of the USB bus to the decoder (1). The master apparatus (2) is, for example, a portable or non-portable personal computer, then comprising an A type USB connector (21.1) to serve the link by way of a USB cable (200) between the computer (2) and the decoder (1). In this configuration, the decoder (1) behaves as a peripheral of the computer (2). This configuration allows:

on the one hand a fast link with a bit rate of 12 megabits per second between the personal computer (2) and the decoder (1) via the USB cable, and on the other hand, by way of the specific cable linking the return pathway of the decoder to the service of the server of the operator, a link of high bit rate (several megabits per second) of the computer (2) to the operator and possibly, through the latter, to the Internet network.

Another use of this configuration allows, for example, decoder file management or the introduction of information to be overlaid onto the images or else more sophisticated interactivity between the user of the computer and of the decoder and the server center of the operator.

Thus, the decoder (1) can be used by the computer (2) as a modem for the bi-directional cabled network to which the decoder (1) is connected.

Other peripherals (7) may be connected to the computer (2) by another A type USB connector (21.1) of the computer (2), by way of a cable (700) linked to the B type USB connector (71) of the peripheral (7), such as for example a printer.

According to the present exemplary embodiment, the decoder (1) comprises at least one second connector (12), for example, an A type USB connector. Each A type USB connector allows, according to the configuration represented in FIG. 1B, connection of at least one peripheral (5, 6 such as a modem etc.) to the decoder (1) by way of a USB cable (300). According to the configuration represented in FIG. 1B, the decoder (1) comprises a single A type USB connector (12). To connect several peripherals to the decoder (1), it is sufficient to connect a splitter (4) (also known as a "hub") of USB type to the A type connector (12) of the decoder by way of a USB cable (300). The splitter (4) then comprises a B type USB connector (41) for linking the decoder and at least two A type USB connectors (42, 43). Each A type connector (42, 43) is used to connect a peripheral (5, 6). Thus, a first peripheral consisting, for example, of a scanner (6) comprises a B type USB connector (61) to serve, via a cable (400) its connection to one of the A type connectors (43) of the splitter (4). A second peripheral consisting, for example, of a printer (5) comprises a B type USB connector (51) to serve, via a cable (40), its connection to the A type free connectors (42) of the splitter (4).

According to the prior art, the USB connectors of a computer system are managed by a USB controller which operates either in master mode or in peripheral mode.

According to the present exemplary embodiment, the decoder (1) also comprises a splitter circuit (17) connected on the one hand to the first and second connectors (11, 12) of the decoder (1) and on the other hand to the controller (14) of the USB connectors (11, 12).

According to the present exemplary embodiment, by way of minor modifications to the decoder (1) consisting in particular in adding the A and B type USB connectors (11, 12) and the splitter (17), the decoder (1) can, therefore, in addition to its main decoding function, carry out other ancillary functions such as managing peripherals or allowing the connection of a computer (2) to the server of the television operator to which it is connected and through this operator to the Internet. Likewise, according to FIG. 1A, the placing of the splitter (17) inside the decoder allows a master apparatus (2) connected to the first B type USB connector (11) to control, that is to say to use, peripherals (5) which would be connected to the second A type USB connector (12) of the decoder (1) which then becomes transparent.

The feature of a B type USB connector is that it comprises a pin intended to receive a supply voltage provided through the A type USB connector of the master device of the USB bus.

Figure 2:
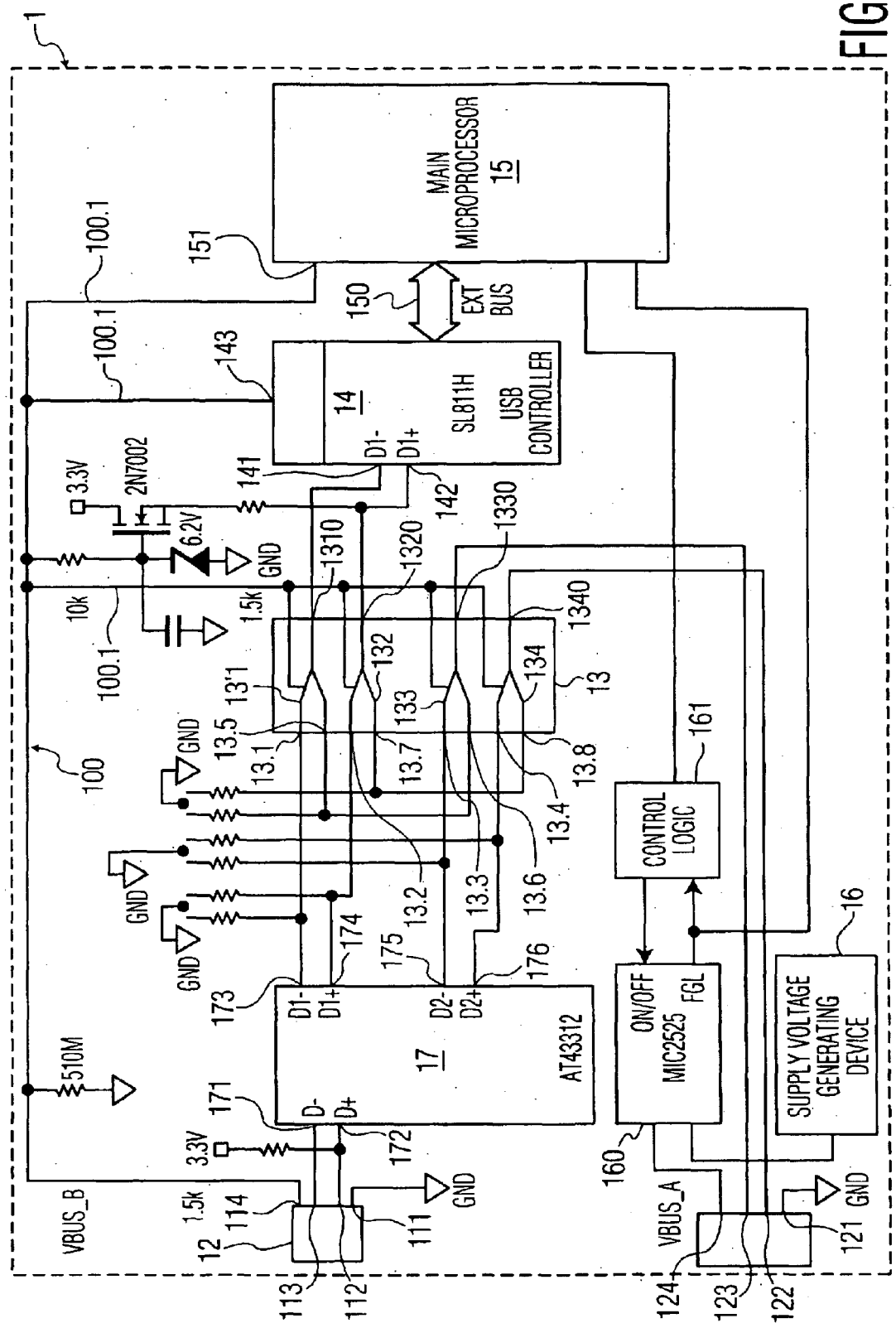
FIG. 2 represents a simplified circuit diagram of an apparatus according to the invention.

According to the present exemplary embodiment, and as represented in FIG. 2, the change of mode of operation of the USB controller (14) and hence of the decoder (1) is carried out by monitoring the appearance of the supply voltage arriving on the B type connector (11) of the decoder (1). The decoder (1) then comprises a link (100) for transmitting the supply voltage linked to the B type connector (11) and to the switching means (13) intended to change the mode of operation of the decoder (1) by going from the master mode of operation to the peripheral, transparent mode of operation when a supply voltage appears.

Each USB connector (11, 12) comprises four pins (111 to 114, 121 to 124). A first pin (111, 121) of each connector (11, 12) is linked to ground. Second and third pins (112, 113, 122, 123) are used to transmit the signals representative of the data and the fourth pin (114, 124) is intended for the electrical supply of the USB bus. According to the present exemplary embodiment, the second, respectively third, pins (112, 113) of the B type connector (11) are connected to a first, respectively second, input (171, 172) (said to be "upstream oriented") of the internal splitter (17). The splitter is for example the circuit marketed by ATMEL under the reference AT 43312. Third, respectively fourth, inputs (173, 174) (said to be "downstream oriented") of the splitter (17) are each linked to a first, respectively second, output (13.1 respectively 13.2) of a switching circuit (13). The first, respectively second, outputs (13.1 respectively 13.2) of the switching circuit (13) are connected to a first pole of a first (131), respectively second, switch (132) of the switching circuit (13) embodied according to the present embodiment by a quad switch.

Fifth, respectively sixth, inputs (175, 176) (said to be "downstream oriented") of the splitter (17) are each linked to a third, respectively fourth, output (13.3 respectively 13.4) of the switching circuit (13). The third, respectively fourth, outputs (13.3 respectively 13.4) of the switching circuit (13) are connected to a first pole of a third, respectively fourth, switch (133 respectively 134) of the switching circuit (13). Each link between the inputs (173 to 176) said to be "downstream oriented" of the splitter (17) and the corresponding outputs (13.1 to 13.4) of the switching circuit (13) are also linked to ground by way of a common point. The output (1310 respectively 1320) of the first, respectively second, switches (131 respectively 132) is connected to a pair of inputs/outputs (141 respectively 142) of the USB controller (14) which communicates with a so-called main microprocessor (15) of the decoder (1) through an external data bus (150).

The second, respectively third, pins (122 respectively 123), of the A type connector (12), are connected to the output (1340 respectively 1330) of the fourth, respectively third, switches (134 respectively 133). A fifth input (13.5) of the switching circuit (13) is connected to the second pole of the first switch (131). This fifth input (13.5) is also connected by a line to a sixth (13.6) input of the switching circuit (13). This sixth input (13.6) is linked to the second pole of the third switch (133). A seventh input (13.7) of the switching circuit (13) is connected to the second pole of the second switch (132). This seventh input (13.7) is also connected by a line to an eighth (13.8) input of the switching circuit (13). This eighth input (13.8) is linked to the second pole of the fourth switch (134).

According to the prior art a master device of a USB bus must provide a supply voltage (VBUS). The decoder (1) being master of the USB bus in one of the two modes of operation, the fourth pin (124) of the A type connector (12) is linked to a device (16) for generating the supply voltage of the USB bus. The line between the fourth pin (124) of the A type connector (12) and the supply voltage generating device (16) also comprises means (160, 161) of protection of the supply voltage generating device (16) against short-circuits. These means (160) of protection comprise according to the present example an MIC2525 component (16) marketed by the company MICREL, connected to control logic (161) linked to the main processor (15).

The USB controller (14) is, for example, an SL8111H component marketed by the company SCANLOGIC.

The two modes of operation of the decoder are obtained by switching the quad switch (131 to 134) from the first pole to the second pole or vice versa.

The change of state, that is to say going from the first pole to the second pole to the quad switch (131 to 134) is triggered by a signal for detecting the appearance of the supply voltage of the USB bus. This signal is transmitted by a first line (100.1) connected to the fourth pin (114) of the B type connector (11). This pin (114) is therefore intended to receive the BUS supply voltage (VBUS) generated by a master apparatus (2) equipped with an A type USB connector (21.1). This first line (100.1) is connected, firstly to an input (143) of the USB controller (14), secondly to an input (151) of the main processor (15) of the decoder (1) and thirdly to each control input of the quad switch (131 to 134) constituting according to the present exemplary embodiment the switching circuit (13).

This first line (100.1) is intended to transmit to the quad switch (131 to 134), to the controller (14) and to the main microprocessor (15), a control signal representative of the appearance of a supply voltage (VBUS) on the fourth pin (114) of the B type connector (11) of the decoder (1). The signal representative of the voltage can be either the voltage itself or a high or low signal interpreted by the switching circuit (13), the USB controller (14) and the main microprocessor (15) as the signal of the appearance of the supply voltage (VBUS).

According to the present exemplary embodiment, as soon as a supply voltage appears on the fourth pin (114) of the B type USB connector (11) and as long as this voltage exists, the first line (100.1) transmits the corresponding signal to the four switching inputs of the quad switch (131 to 134), so that the quad switch (131 to 134) toggles and remains in the first position represented as a solid line so as to connect the first, second, third and fourth input (13.1 to 13.4) of the switching circuit (13) to the outputs (1310, 1320, 1330, 1340) of the quad switch (131 to 134).

Likewise, the reception of the signal representative of the appearance of a supply voltage (VBUS) on the B type connector (11), on the input of the USB controller (14), by way of the first line (100.1), triggers the switching of the USB controller (14) into the peripheral mode. Finally, the reception of a signal representative of the appearance of a supply voltage (VBUS) on the B type connector (11), by way of the first line (100.1), on the input (151) of the main microprocessor (15), triggers a procedure for the hardware and software configuration of the decoder (1) into the peripheral mode and the inactivation of the transmission of the output signal of the supply voltage generator (16).

In this mode, the inputs/outputs (141, 142) of the controller are connected to the third and fourth inputs (173, 174) of the splitter and the second and third pins (122, 123) of the A type USB connector (12) are connected to the fifth and sixth inputs (175, 176) of the splitter (17). Thus, the master apparatus (2) connected to the B type USB connector (11) can access the resources, for example the return channel of the decoder (1), through the splitter (17), through the switching circuit (13) of the controller (14) and the main microprocessor (15).

Thus, as soon as a master apparatus, such as a computer (2) is connected and/or turned on, the decoder (1) is automatically configured in the peripheral mode. In this mode, the decoder (1) can behave, according to the chosen configuration, as a modem in relation to the computer (2) so as to allow, for example, connection to the Internet via the return channel of the decoder (1).

Moreover, the master apparatus (2) can access the peripherals (4) connected to the A type connector (12) of the decoder (1). In this instance, the apparatus (2) transmits a signal to the B type USB connector (11), for example on the second input (172) of the splitter (17) so as to transmit a command to the main microprocessor (15) through the fourth output (174) of the splitter (17) of the second switch (132) and the second input/output (142) of the USB controller (14). This command is interpreted by the main microprocessor (15) as a supply command for the fourth pin (124) of the A type connector (12) of the decoder (1). This command is transmitted by the main microprocessor (15), to the MIC2525 component through the control logic (161) so as to permit the fourth pin (124) of the A type connector (12) of the decoder (1) to be supplied with electrical power.

Thus, in the peripheral mode of operation, the USB connectors (11, 12) of the decoder (1) can be used simultaneously.

As soon as the supply voltage (VBUS) disappears, the link (100) and the first line (100.1) transmit the corresponding signal to the switching circuit (13), so that the quad switch (131 to 134) toggles into the second position represented by dotted lines so as to connect the fifth, sixth, seventh and eighth inputs (13.5 to 13.8) of the switching circuit (13) to the outputs (1310, 1320, 1330, 1340) of the four switches (131 to 134).

The disappearance of the signal representative of the supply voltage (VBUS) on the B type connector (11), on the input (143) of the USB controller (14), triggers the switching of the USB controller (14) into the master mode. Likewise, the disappearance of the signal representative of the appearance of a supply voltage (VBUS) on the B type connector (11), on the input (151) of the main microprocessor (15) triggers a procedure for the hardware and software configuration of the decoder (1) so as to configure the decoder (1) into the master mode.

In this mode, the B type USB connector (11) and the splitter (17) are totally disconnected from the data stream of the USB controller (14). Only the A type USB connector (12) can therefore be used by the microprocessor (15) through the USB controller (14).

Thus, by default, that is to say when the decoder (1) is not connected by way of a USB link to a master apparatus (2) which is turned on, the decoder (1) can control at least one peripheral (5, 6) and thus behaves as a master device. In this mode, the hardware and software configuration of the decoder (1) makes it possible, for example, to print on the printer (4) connected to the decoder (1), an image stored by the decoder (1).

The variant embodiment just described is embodied with the topology of the USB connectors. However, any other type of equivalent connector can be used in so far as at least one of the conductors of the chosen connector is used to transmit an electrical supply for the master apparatus from the bus to the peripheral or peripherals.

It should be obvious to persons versed in the art that the present invention allows embodiments under numerous other specific forms without straying from the field of application of the invention as claimed. Consequently, the present embodiments must be regarded by way of illustration but may be modified within the field defined by the scope of the attached claims.

In particular, the invention is not limited to television decoders but may be applied to any communication device linkable to a cabled bus.

What is claimed is:

1. An apparatus for receiving audio-visual programs comprising a circuit for communication with means of connection to a bi-directional communication network, wherein the apparatus comprises:

a first connector of a communication bus with a master apparatus, the first connector comprising at least one conductor for the transmission of a supply voltage (VBUS) originating from the master apparatus, at least one second connector of said communication bus, each second connector allowing the connection of at least one peripheral device, a splitter connected on the one hand to the first connector and the at least one second connectors through a switching circuit and on the other hand to a controller, means of detection of the presence of the supply voltage (VBUS) in the first connector, the means of detection being linked to the first connector and generating a switching control signal to the switching circuit, in response to the presence of the supply voltage so as to switch the apparatus from a first mode of operation to a second mode of operation where the switching circuit establishes communications between the master apparatus connected to the first connector and said at least one peripheral device connected to said at least one second connector.

2. The apparatus according to claim 1, wherein the first mode of operation is a so-called master mode of operation, in which the apparatus behaves as a master in relation to each peripheral device, and in that the second mode of operation is a so-called peripheral mode of operation in which the apparatus behaves as a peripheral device in relation to the master apparatus.

3. The apparatus according to claim 1, wherein the first connector is a B type USB connector and in that each second connector is an A type USB connector.

4. The apparatus according to claim 1, wherein the switching circuit comprises a quad switch, linked to the controller and to the second connector, so as to allow a first link between the second connector and the controller when a signal representative of the supply voltage disappears.

5. The apparatus according to claim 4, wherein a second link transmits a supply voltage detection signal so as to control the switching from one state to another state, to an input of the controller and to an input of a main microprocessor.

6. The apparatus according to claim 4, wherein, when the quad switch is switched into a first state, the apparatus operates in peripheral mode and when the quad switch is switched into a second state, the apparatus operates in master mode.

7. The apparatus according to claim 1, wherein the switching circuit comprises a quad switch, linked to the controller and to a two-pathway splitter, the two-pathway splitter being linked to the first connector so as to allow in a second switching state a second link between on the one hand the first connector and the controller and between on the other hand the first link between the first connector and the second connector.

8. The apparatus according to claim 1, wherein the master apparatus is a personal computer and the apparatus comprises a digital decoder connected to the bi-directional communication network so as to allow the computer to communicate with said bi-directional communication network.

9. The apparatus according to claim 1, wherein the at least one peripheral device is linked to the second connector of the apparatus by way of an additional splitter.

* * * * *

UNITED STATES PATENT AND TRADEMARK OFFICE
CERTIFICATE OF CORRECTION

PATENT NO.    : 6,880,036 B2
DATED         : April 12, 2005
INVENTOR(S)   : Jean-Pierre Bertin, Xavier Guitton and Phippe Lepoil It is certified that error appears in the above-identified patent and that said Letters Patent is hereby corrected as shown below:

<u>Title page,</u>
Item [75], Inventors, change "Phippe Lepoil" to -- Philippe Lepoil --

Signed and Sealed this

Seventh Day of June, 2005

JON W. DUDAS
*Director of the United States Patent and Trademark Office*